United States Patent
Torii et al.

[11] Patent Number: 5,838,791
[45] Date of Patent: Nov. 17, 1998

[54] ENCODER AND DECODER

[75] Inventors: Naoya Torii; Noboru Iwayama; Masahiko Takenaka; Takayuki Hasebe; Masahiro Matsuda, all of Kawasaki, Japan

[73] Assignee: Fujitsu Limited, Kanagawa, Japan

[21] Appl. No.: 512,909

[22] Filed: Aug. 9, 1995

[30] Foreign Application Priority Data

Aug. 10, 1994 [JP] Japan .................................. 6-219368

[51] Int. Cl.[6] .................................................. H04N 7/64
[52] U.S. Cl. .............................. 380/20; 380/49; 386/112
[58] Field of Search .............................. 380/20, 37, 99, 380/50; 386/112

[56] References Cited

U.S. PATENT DOCUMENTS

| | | |
|---|---|---|
| 4,247,106 | 1/1981 | Jeffers et al. . |
| 4,439,670 | 3/1984 | Basset et al. . |
| 4,446,519 | 5/1984 | Thomas . |
| 4,484,217 | 11/1984 | Block et al. . |
| 4,558,176 | 12/1985 | Arnold et al. . |
| 4,590,557 | 5/1986 | Lillie . |
| 4,646,234 | 2/1987 | Tolman et al. . |
| 4,649,510 | 3/1987 | Schmidt . |
| 4,654,799 | 3/1987 | Ogaki et al. . |
| 4,658,093 | 4/1987 | Hellman . |
| 4,672,554 | 6/1987 | Ogaki . |
| 4,674,055 | 6/1987 | Ogaki et al. . |
| 4,740,890 | 4/1988 | William . |
| 4,780,905 | 10/1988 | Crutis et al. . |
| 4,787,050 | 11/1988 | Suzuki . |
| 4,816,653 | 3/1989 | Anderl et al. . |
| 4,816,654 | 3/1989 | Anderl et al. . |
| 4,817,140 | 3/1989 | Chandra et al. . |
| 4,864,516 | 9/1989 | Gaither et al. . |
| 4,879,645 | 11/1989 | Tamada et al. . |
| 4,949,257 | 8/1990 | Orbach . |
| 4,999,806 | 3/1991 | Chernow et al. . |
| 5,006,849 | 4/1991 | Baarman et al. . |
| 5,008,814 | 4/1991 | Mathur . |
| 5,014,234 | 5/1991 | Edwards, Jr. . |
| 5,016,009 | 5/1991 | Whiting et al. . |
| 5,051,822 | 9/1991 | Rhoades . |
| 5,056,009 | 10/1991 | Mizuta . |
| 5,103,392 | 4/1992 | Mori . |
| 5,103,476 | 4/1992 | Waite et al. . |
| 5,161,194 | 11/1992 | Ujiie .......................................... 380/48 |

(List continued on next page.)

OTHER PUBLICATIONS

Japanese Patent Laid–Open Publication No. 57–127249, Aug. 7, 1982 (equivalent to Japanese Patent Publication No. 61–22815).
Japanese Patent Laid–Open Publication No. 5–89363, Apr., 1993.
Japanese Patent Laid–Open Publication No. 5–266575, Oct. 15, 1993.
Japanese Patent Laid–Open Publication No. 5–298085, Nov. 12, 1993.
Japanese Patent Laid–Open Publication No. 6–95871, Apr. 8, 1994.

*Primary Examiner*—Gilberto Barron, Jr.
*Attorney, Agent, or Firm*—Staas & Halsey

[57] ABSTRACT

The present invention was made in order to provide a technology capable of safely ciphering compressed and encoded image data irrespective of lines or media and carrying out a correct decoding operation without any shifts in the frames of ciphered moving pictures.

Further, so as to prevent giving any means of encoding from comparison of image ciphered data and so as to generate totally different ciphered image data from the same data compressed images, a processing is executed not on an ECB mode but on such modes as CBC, CFB, OFB or the like. Moreover, as an initial vector, information different for frames included in a header, that is, time information from the start of an image or a frame sequential number, is used. In this way, even if compressed images within adjacent frames are accidentally the same, totally different ciphered data can be obtained.

10 Claims, 13 Drawing Sheets

U.S. PATENT DOCUMENTS

| | | |
|---|---|---|
| 5,166,886 | 11/1992 | Molnar et al. . |
| 5,181,107 | 1/1993 | Rhoades . |
| 5,199,066 | 3/1993 | Logan . |
| 5,214,697 | 5/1993 | Saito . |
| 5,222,134 | 6/1993 | Waite et al. . |
| 5,245,330 | 9/1993 | Wassink . |
| 5,267,171 | 11/1993 | Suzuki et al. . |
| 5,461,618 | 10/1995 | Chen et al. ............................ 370/94.1 |
| 5,479,299 | 12/1995 | Matsumi et al. ....................... 360/14.1 |
| 5,535,275 | 7/1996 | Sugisaki et al. .......................... 380/10 |
| 5,546,461 | 8/1996 | Ibaraki et al. ............................ 380/20 |
| 5,600,721 | 2/1997 | Kitazato ................................... 380/20 |

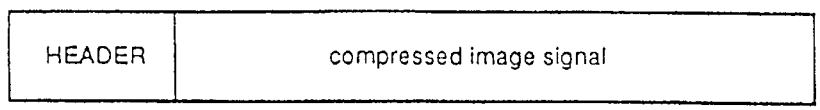
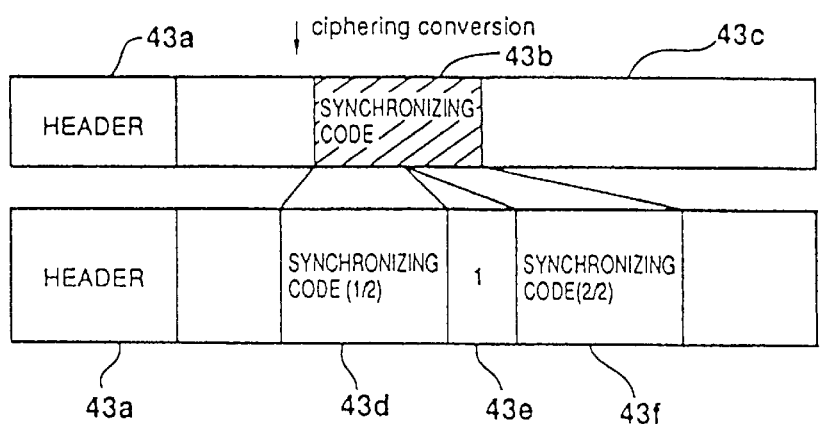
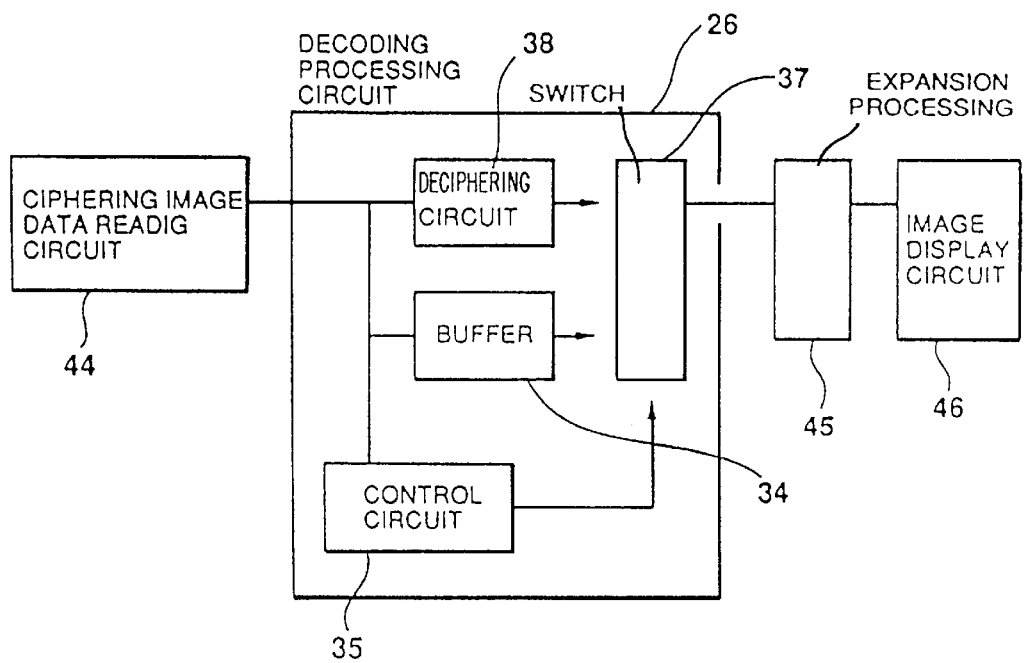

ENCODER AND DECODER

BACKGROUND OF THE INVENTION

The present invention provides a technology effective in terms of data distribution, wherein compressed and encoded data such as static and moving pictures, or the like are transmitted via CD-ROM and networks by a control center and such data are reproduced mainly by personal computers, etc.

The following processings are carried out when data of moving pictures are compressed and ciphered, stored in such various kinds of storage media as CD-ROM or the like and distributed.

At the side for providing static or moving picture data (encoding means), after original moving pictures are first compressed and encoded at a compressing and encoding part in accordance with the standards of MPEG, etc., they are ciphered at a ciphering part and stored in CD-ROM.

Then, at the end user side (decoding means), after data are read from CD-ROM by such means as a CD-ROM driving device or the like, they are deciphered at a deciphering part 6 of DES (Data Encryption Standard), etc. As for this decoding part, the ones conforming to the standard, for example, "DATA ENCRYPTION STANDARD NIST" of "FIPS PUB 46" can be used.

Further, these deciphered data are expanded at an expansion part of a MPEG decoder, etc., and restored to the original moving pictures.

By such conventional system, however, decoding must be carried out starting from the head of the moving picture data in order, and thus reverse reproduction and random accessing have not been allowed. In order to solve this problem, of frame data which are processing units of image data, a method of ciphering only image data without ciphering header data including control data necessary for random accessing may be considered.

However, the starting position of the image data frame of MPEG, for example, is identified only by a synchronous pattern which is a special bit string located at the lead of a header, As nonciphered image compressed data are encoded so as to prevent appearance of synchronous patterns on compressed codes, frame synchronization can be easily made by retrieving synchronous patterns. On the other hand, as ciphered image data become a random bit string, synchronous patterns are generated due to accidents making it hard to make frame synchronization, and thus the image data can not be correctly decoded.

Further, when image data are ciphered, as their compressed image signals are similar in the case of moving pictures which show almost no movements, if they are ciphered by an ECB mode ciphered data are also made similar, and thus the chances of decoding are increased.

SUMMARY OF THE INVENTION

The present invention first provides a compressing and encoding part for compressing and encoding original data as an encoder and a data length obtaining means for obtaining frame data lengths by carrying out frame analysis in the inputting order of the compressed and en coded data. It further provides a ciphering processing part for ciphering the compressed and encoded data and generating ciphered and compressed image data, a header generating part for generating a header storing synchronous patterns and a moving picture data assembling part for assembling the obtained header, the frame data lengths and the ciphered and compressed data.

Secondly, the present invention provides, as a decoder corresponding to the first means, a header obtaining part for reading the synchronous patterns and obtaining a header, a frame data length obtaining part for reading frame data lengths and a counter on which the frame data lengths obtained at the frame data length obtaining part. Then, at the decoding part the ciphered and compressed image data are sequentially deciphered without carrying out frame analysis and compressed images data are obtained. It further provides an expansion processing part for expanding the compressed image data thus obtained.

Thirdly, the present invention provides a compressing and encoding part for compressing and encoding original data, a header generating part for generating a header storing synchronous patterns, a ciphering processing part for ciphering the compressed and encoded data and generating ciphered and compressed image data and a bit inserting part for inserting dummy bit into the synchronous patterns when the synchronous patterns in ciphered and compressed image data are detected by monitoring the ciphering processing part. The, at the moving picture data assembling part, the obtained header and the ciphered and compressed image data are assembled.

According to the first means, a data format is divided into a header area, a frame length area and a ciphered and compressed image data area.

In this way, as the frame length area is provided giving knowledge of its own frame length, by using the second means the frame length can be surely grasped when decoding is operated at the decoder, for example, and frame feeding, etc., can be carried out as well when moving picture data are reproduced.

According to the third means, in the case where it is expected that synchronous patterns equal to the header will be generated in ciphered and compressed images to be generated, by inserting the dummy bit into the synchronous patters beforehand, at the decoder side header detection by the synchronous patterns can be assured and made easy.

BRIEF DESCRIPTION OF THE DRAWINGS

FIGS. 14A and 14B are views showing a data format obtained by an encoder at the embodiment 2.

FIG. 15 is a block diagram showing the function of a decoder at the embodiment 2.

DETAILED DESCRIPTION OF THE INVENTION DESCRIPTION OF THE PREFERRED EMBODIMENTS

Prior to description of the preferred embodiments the present invention will be outlined with reference to the accompanying drawings.

Figure 1:
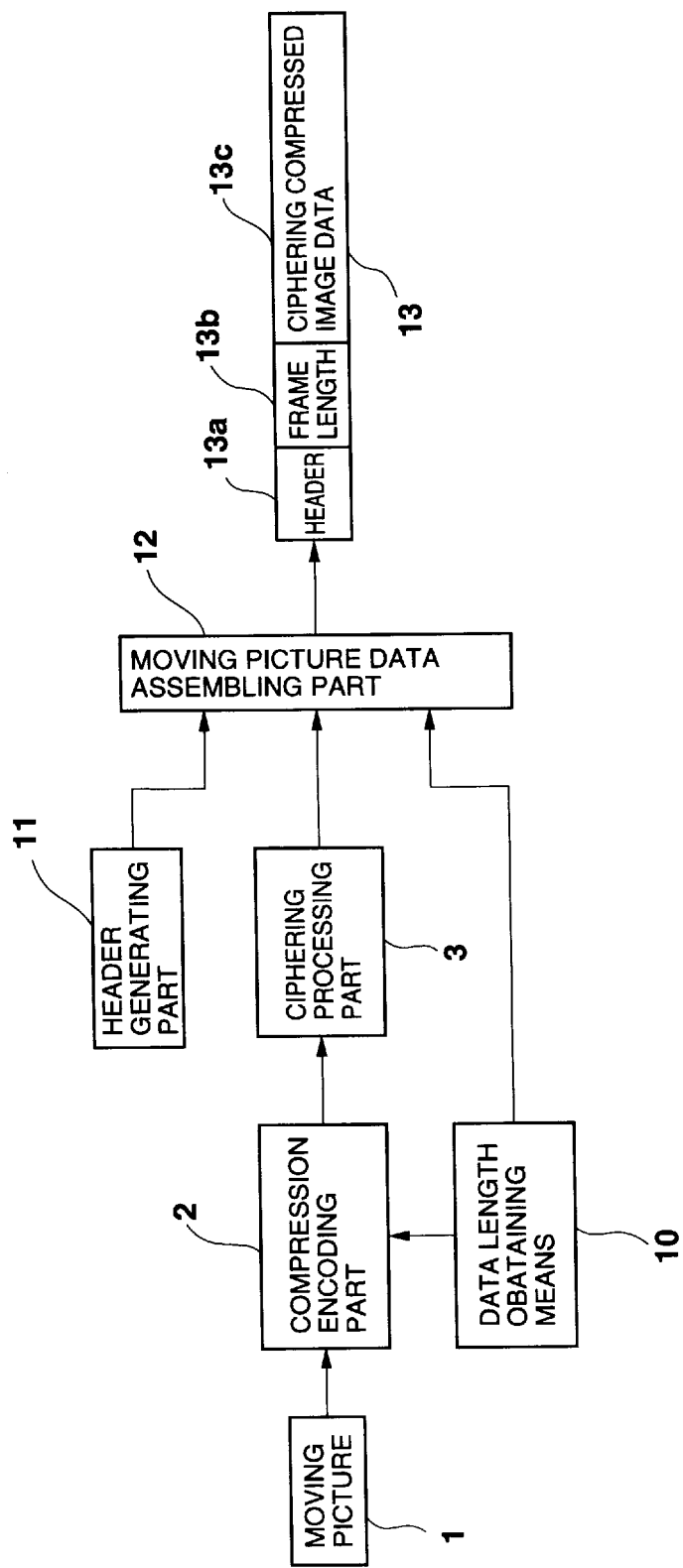
FIG. 1 is a view showing the principle of the present invention.
Figure 2:
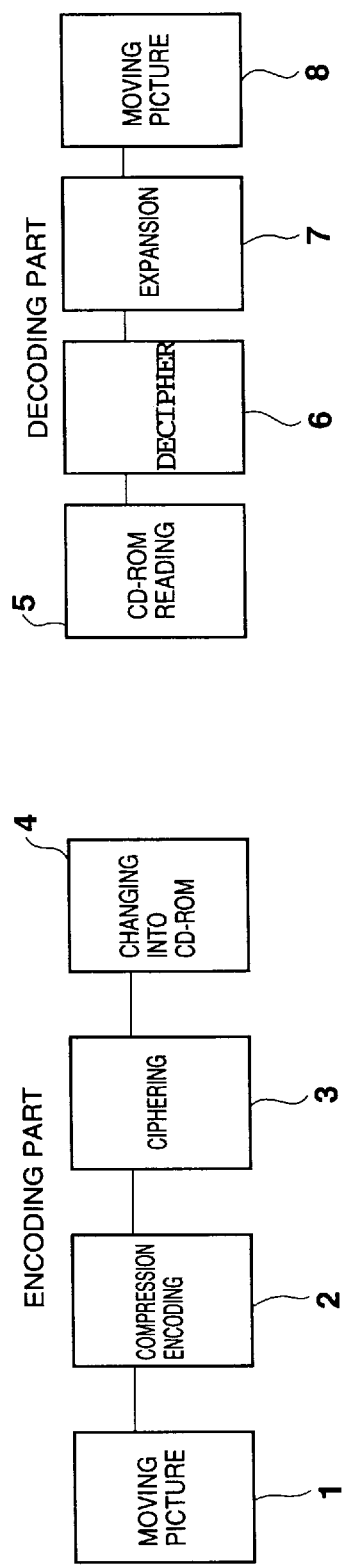
FIG. 2 is a view showing a conventional ciphered image compressing technology.

As shown by the principle view in FIG. 1, the present invention provides as an encoder a compressing and encoding part (2) for compressing and encoding original data (1) and a data length obtaining part (10) for carrying out frame analysis in the inputting order of the compressed and encoded data. It further provides a ciphering processing part (3) for ciphering the compressed and encoded data and generating ciphered and compressed image data, a header generating part (11) for generating a header storing synchronous patterns and a moving picture data assembling part (12) for assembling the obtained data, frame data lengths and ciphered and compressed image data.

Secondly, as a decoder corresponding to the first means, the invention provides a header obtaining part for reading the synchronous patterns and obtaining a header and a counter on which frame data lengths obtained by the frame data length obtaining part are set. Then, at the decoding part without carrying out frame analysis the ciphered and compressed image data are sequentially decoded based on the value of the counter, and thereby compressed image data are obtained. It further provides an expansion processing part for expanding the compressed image data thus obtained.

Thirdly, the invention provides a compressing and encoding part for compressing and encoding original data, a header generating part for generating a header storing synchronous patterns, a ciphering processing part for ciphering the compressed and encoded data and generating ciphered and compressed image data and a bit inserting part for inserting dummy bit into the synchronous patterns when the synchronous patterns in the ciphered and compressed image data are detected by monitoring the ciphering processing part. Then, the obtained header and the ciphered and compressed image data are assembled at the moving picture data assembling part.

A data format is composed of, for example, a header, an ID, a header area including a ciphered flag and a payload storing ciphered and compressed image signals.

Further, by providing a frame length area for recording its own frame length on the tip of the payload, frame lengths can be surely grasped when decoding is carried out at the decoder and frame feeding, etc., can be operated as well when moving picture data are reproduced.

Further still, in the case where it is expected that synchronous patterns similar to the header will be generated in the ciphered and compressed image data to be generated, by inserting the dummy bit into the synchronous patterns beforehand, header detection by the synchronous patterns can be assured and made easy at the decoder side. The preferred embodiments of the present invention will be described hereinbelow.

EMBODIMENT 1

Figure 3:
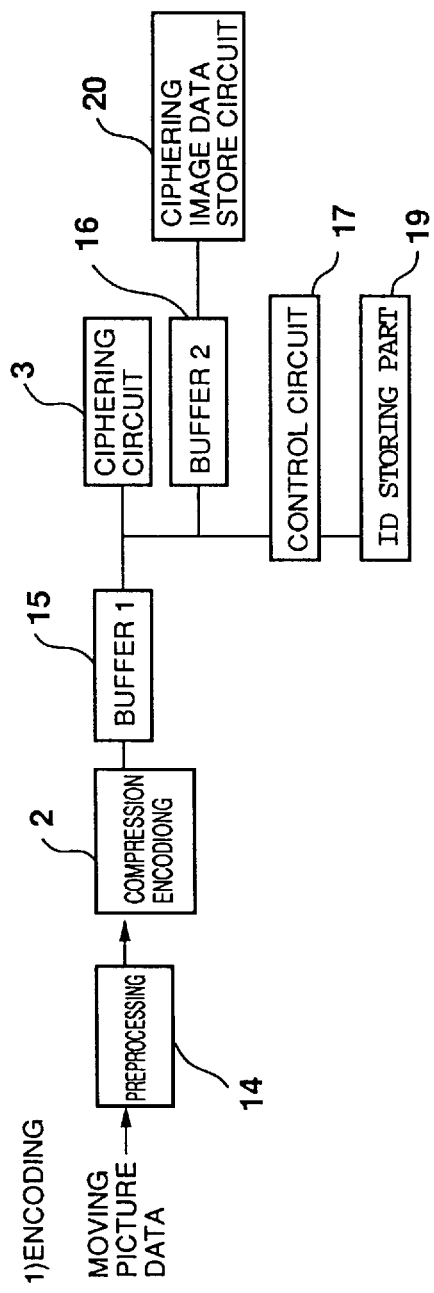
FIG. 3 is a block diagram showing the circuit construction of an encoder at the embodiment 1.

FIG. 3 is a block diagram showing the circuit construction of an encoder at the embodiment 1.

(CONSTRUCTION OF THE ENCODER)

As shown in this Figure, a preprocessing part 14 is provided with a function for digitizing original data.

A compressing and encoding circuit 2 at the next stage is provided with a function for compressing and deforming digitized moving picture data in accordance with a MPEG standard.

A first buffer 15 is for storing moving picture data (compressed and encoded data) compressed and deformed at the compressing and encoding part 2. A ciphering circuit 3 is provided with a function for converting compressed and encoded data into ciphered data. Moreover, as ciphering processings executed by the ciphering circuit 3, there exist a method of ciphering only the image data of moving picture data and a method of ciphering both image data and audio data.

A control circuit 17 is connected to the first buffer 15, a second buffer 16 and the ciphering circuit 3 and provided with a function for assembling ciphered frame data. Further, the control circuit 17 is provided with an ID storing part 19, and ID is registered in the header at the time of frame assembling.

The second buffer 16 is for storing ciphered frame moving picture data, and a ciphered image data storing circuit 20 is provided with a function for arranging ciphered frame moving picture data as ciphered image data, that is, a function for assembling the header, frame lengths and ciphered and compressed data as frame data of 1 unit.

Next, a processing procedure at this embodiment will be described with reference to a flow chart in FIG. 4 hereinbelow.

First, the control circuit 17 executes a initializing processing (step 401). For this initializing processing, as shown by a flow chart in FIG. 5, the first and second buffers 15 and 16 must be cleared (step 501). Then, the ciphering circuit 3 is cleared and a ciphering key is set thereon.

Figure 4:
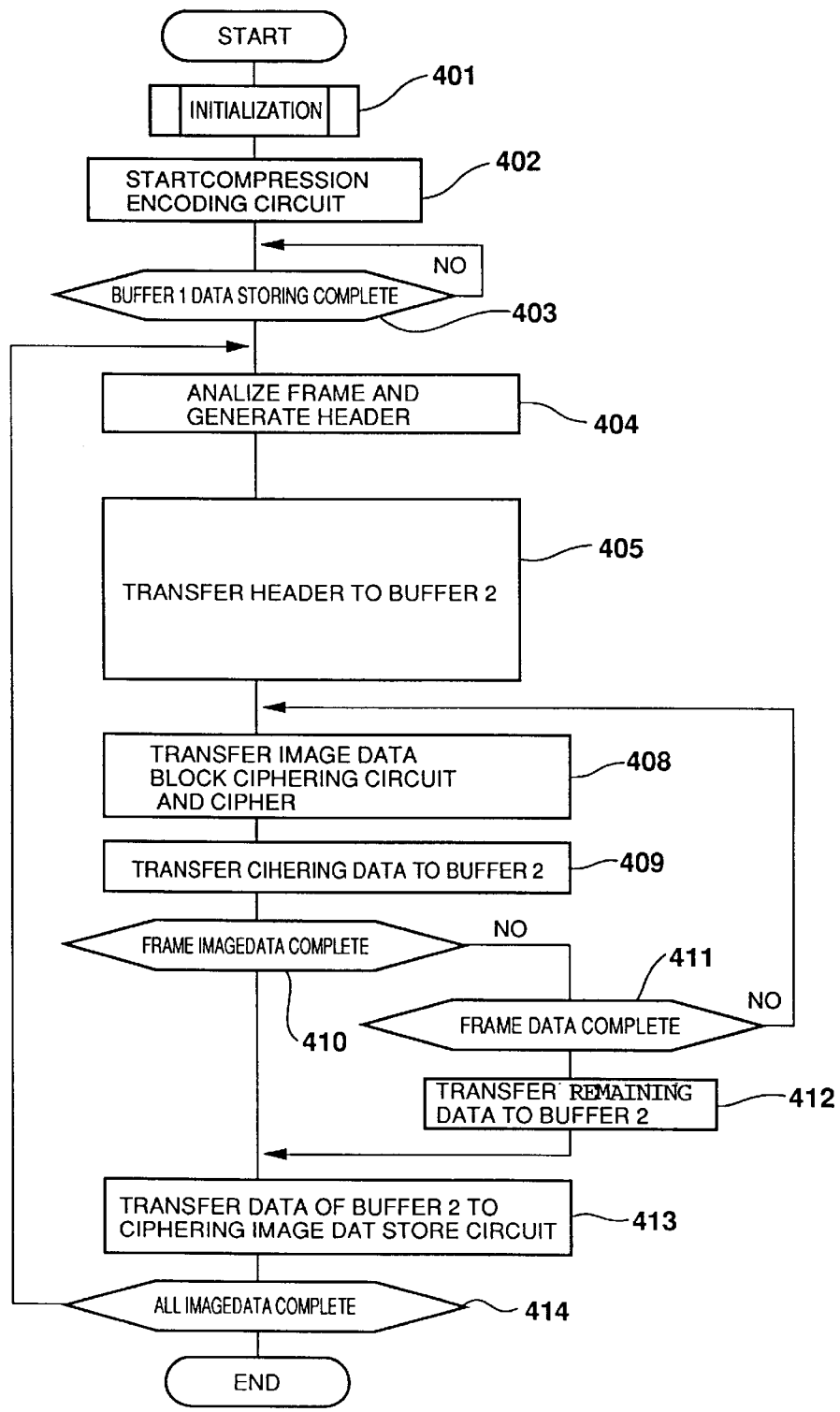
FIG. 4 is a flow chart showing the processing procedure of an encoder at the embodiment 1.

After such initializing processing is completed, as shown by the flow chart in FIG. 4, the compressing and encoding circuit 2 will be started (402).

Image data are compressed and encoded by this compressing and encoding circuit 2 and stored sequentially in the first buffer 15 (403).

Next, the control circuit 17 operates frame analyzing in the inputting order of the compressed and encoded data and generates a header (404). At this time, the control circuit 17 reads ID from the ID storing part 19 and registers the ID in the header. Then, the control circuit 17 transfers the header thus made to the second buffer 16 (405).

Then, the image data parts are sequentially ciphered at the ciphering circuit 3 (408), and when an amount equivalent to 1 frame is completed, the data will be written in the second buffer 16 (409).

In this way, the header and the payload of the frame already stored in the second buffer 16 are combined and frame assembling is completed.

When the ciphering processing is completed (401), the data of 1 frame in the second buffer 16 will be output to the ciphered image data storing circuit 20.

When a next frame is read, the processing similar to the one mentioned above will be repeated thereafter until the data in the first buffer 15 are completed (414).

Here, the ciphering circuit uses high-speed and safe algorithm. For example, U.S.A's standard DES (Data Encryption Standard), FEAL (Fast Encryption Algorithm) or IDEA (International Data Encryption Algorithm) may be used. However, as frame lengths change by bit units, in the case of using these block codes it is necessary to take such measures as not to cipher the parts thereof before data to be ciphered reach block lengths or the like. As for treating these remaining parts, in addition to the above, there exist (1) a method of inserting specified patterns until the data reaches the block length, (2) a method of treating them on a CBS mode+k bit CFB mode(k bit means remaining ciphered bit) and others. At this time, the initial vector of the CFB mode must be the last value of the CBC mode. Or, either (4) 64 bit OFB mode, (5) 1 bit OFB mode or (6) 1 bit CFB mode can be selected, as well. Also, there is a method available using time data or sequential numbers included in the frame header as the initial vector for ciphering which is necessary for CBD, OFB or CFB mode. In this way, even when compressed images within accidentally adjacent frames are the same, ciphered data totally different to each other can be obtained.

Figure 6:
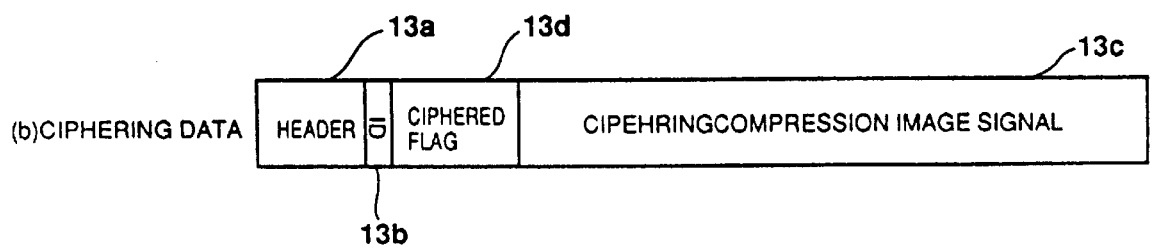
FIG. 6 is a view showing a data format at the embodiment 1.

A frame format finally assembled at this embodiment is shown in FIG. 6.

A frame assembled at the ciphered image data storing circuit 20 includes a header area 13a, an ID area 13b, a ciphered flag 13d and a payload 13c, and ciphered and compressed image signals are stored in the layload 13c.

In the header area 13a image expansion control signals (synchronous signals) are written while in the ID area 13b IDs which are identifiers for the frames are recorded. By detecting these IDs the control means of the decoder allows grasping the sequence of the frames.

Further, on the ciphered flag 13d a flag is hoisted showing ciphering of the data.

(CONSTRUCTION OF THE DECODER)

Figure 7:
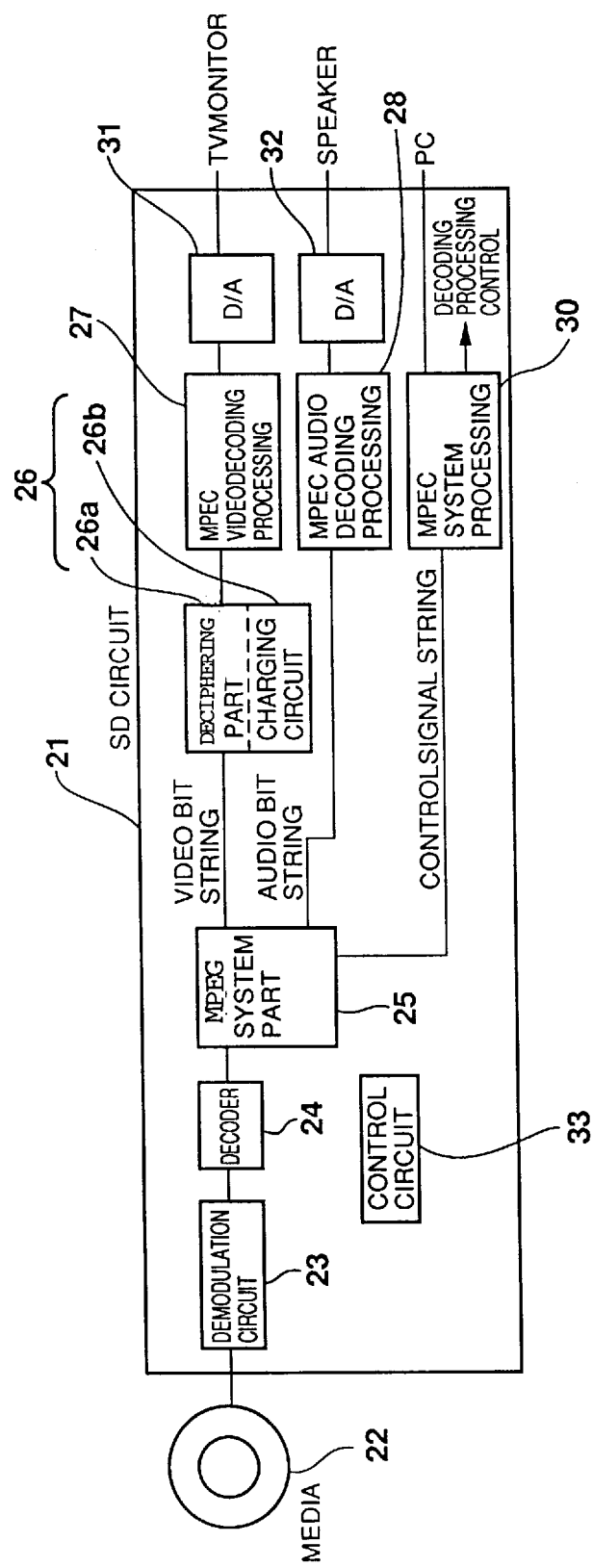
FIG. 7 is a block diagram showing the functional construction of a decoder at the embodiment 1.

FIG. 7 is a block diagram showing the construction of a decoder at this embodiment.

At a decoder 21 CD-ROM 22 is used as a medium and in this CD-ROM 22 image data in the format described above referring to FIG. 6 are registered.

Figure 9:
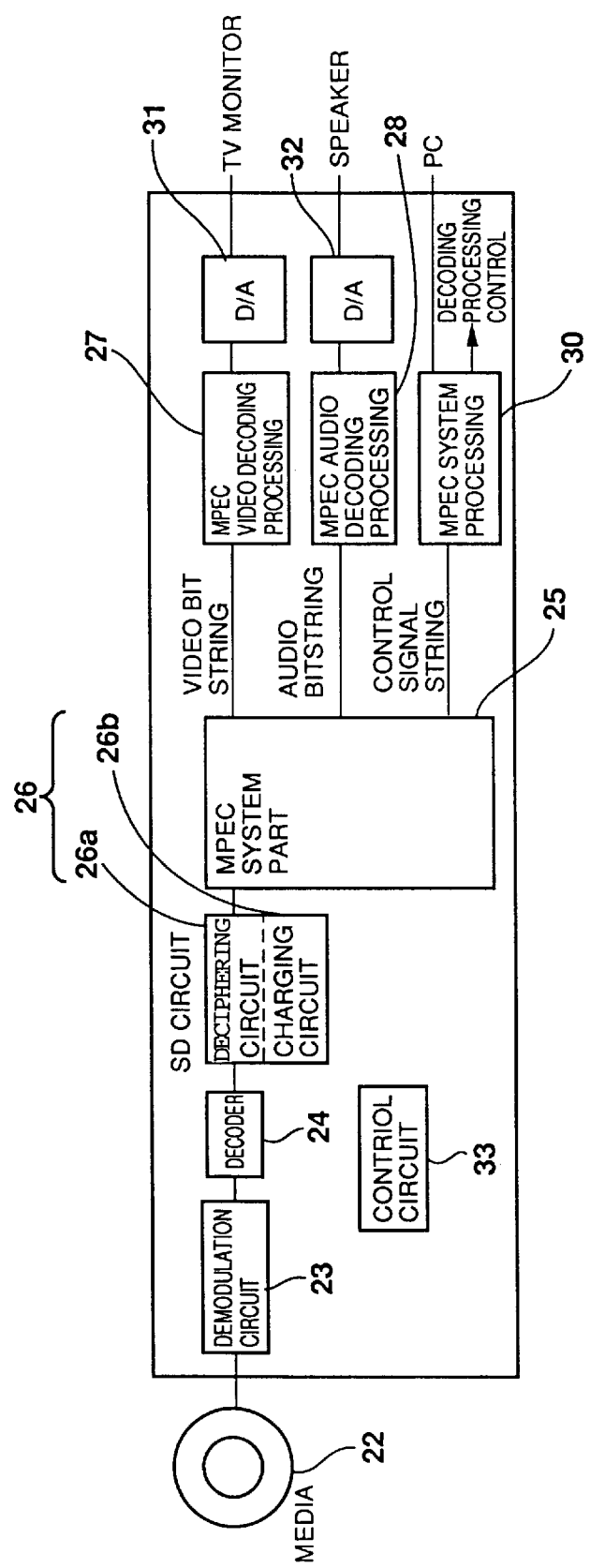
FIG. 9 is a block diagram showing the example of the changed construction of a decoder at the embodiment 1.

In the Figure, 23 indicates a demodulation circuit for reading data from the CD-ROM 22, demodulating them and transferring to a decoder 24. An MPEG system part 25 is provided with a function for separating image as well as audio data from MPEG data. In this Figure, the case where only image data are ciphered is considered. However, when both image and audio data are ciphered, a new decoder part similar to that for images may be inserted into an audio bit string or by changing the inserting position of an SD circuit a construction as shown in FIG. 9 may be adopted.

As an MPEG system part, a chip conforming to the standard of, for example, "ISO/IEC CD 13818-1 to 3" may be used.

A control circuit 33 is a host computer and controls the entire device.

An SD circuit 26 is composed of a deciphering part 26a and a charging part 26b, converted into a module and provided to the device in the form of an IC card or a board.

Figure 8:
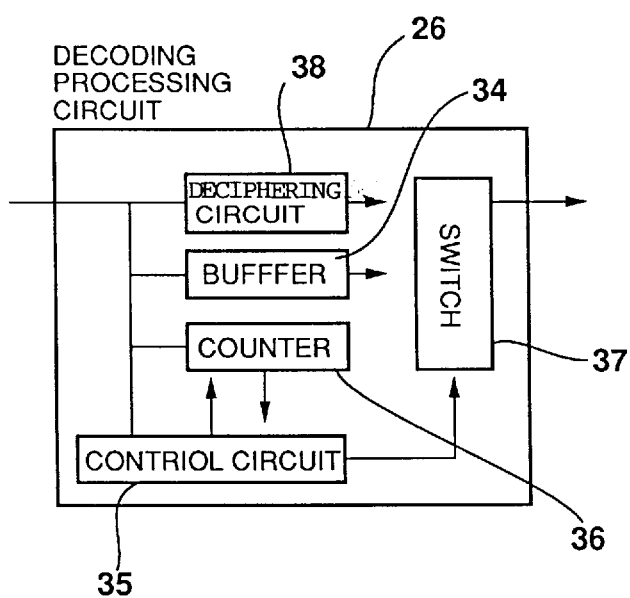
FIG. 8 is a block diagram showing the functional internal construction of an SD circuit at the embodiment 1.

The decipher of the decoding circuit composing the SD circuit 26 is shown in FIG. 8.

The decoding part 26b includes a control part 35, and a decoding circuit 38, a buffer 34 and a counter 36 which are controlled by this control circuit 35. The deciphering circuit 38 includes the so-called DES circuit when DES algorithm is used, allowing deciphering ciphered data based on such logics as ECB, CBC, OFB, CFB or the like. Further, by the control circuit key data for decoding, initial vectors necessary for processings on CBC, CFB, OFB modes, and a ciphering processing mode can be set.

The counter 36 is for counting the amount of data to be input in accordance with the controlling of the control circuit 35.

Next, a decoding procedure at the decoder 21 will be described with reference to FIGS. 10 and 11.

Figure 11:
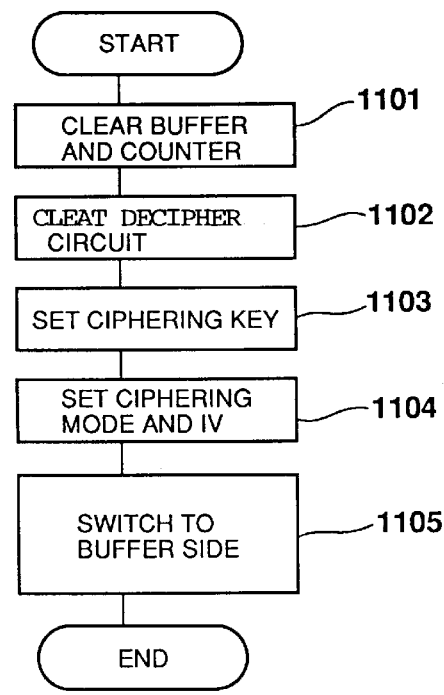
FIG. 11 is a flow chart showing the initializing procedure of a decoder at the embodiment 1.

The control circuit 35, as shown by the flow chart in FIG. 11, operates initialization processing prior to reading of ciphered data. That is, the buffer 34 and the counter 36 are cleared (1101), the deciphering circuit 38 is cleared (1102), and by obtaining the same ciphered key as used for ciphering, an initial vector and a processing mode beforehand, setting of key data (1103), setting of the same number mode as used for ciphering processing and setting of the initial vector (1104) are carried out. Then, a switch will be set on the buffer side (1105).

Figure 10:
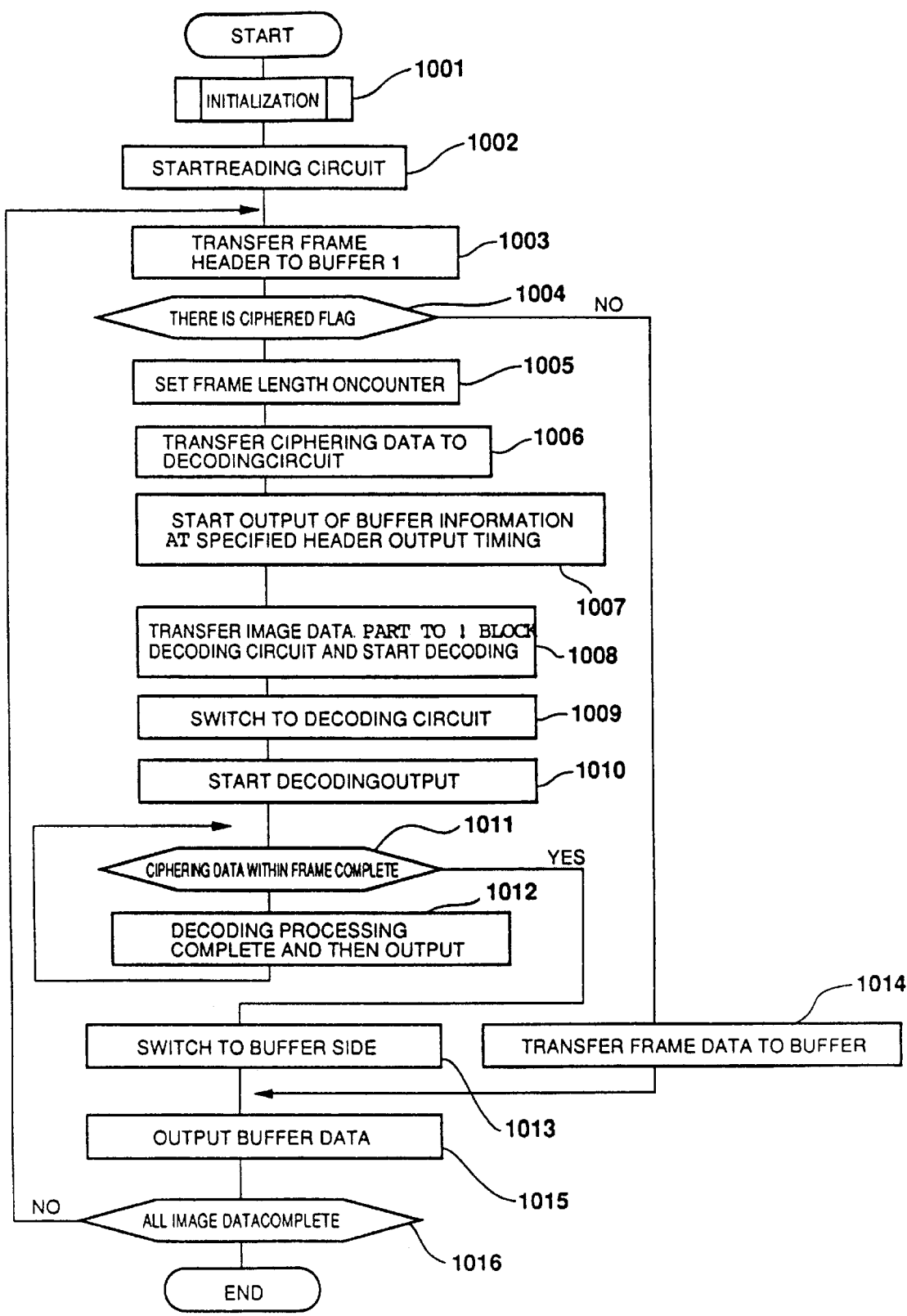
FIG. 10 is a flow chart showing a decoding procedure at the embodiment 1.

When the initialization is completed, as shown by the flow chart in FIG. 10, the control circuit 35 will start a reading circuit (the demodulation circuit 23 and the decoder 24) and start data decoding (1002). The header of the read frame will be input to the buffer (1003).

At the control circuit 35, header analyzing is carried out. Here, when a synchronous pattern is detected, the following ciphered flag will be detected (1004), the following current frame length will be read, from this value a value equivalent to the header length will be subtracted and set on the counter 36 (1005). Then, ciphered data to be input will be input to the decoding circuit 38 with its bit number counted by the counter 36 (1006). At the time of this decoding processing frame analyzing will not be operated by the control circuit.

The deciphering circuit 38 carries out decoding processing by block units. Here, when there are ciphered data not reaching a block, a processing similar to the ciphering processing described above will be executed.

Such items as the ciphered flag, the current frame length, the reframe length or the like inserted on the encoder side at the time of ciphering must be controlled by the control circuit so as not be input. Output of the header data from the buffer will be started so as to allow outputting of decoded image data at an outputtable timing (set beforehand) immediately after frame header output (1007). At this time, a switch must be on allowing outputting of the content of the buffer.

Then, after the header data is output, a switch will be changed to a decoding circuit output side and decoded data will be output (1009, 1010).

The control circuit 35 sets a header output timing and a decoding processing end timing consulting a counter value.

When output of data equivalent to a frame is completed (1011), the switch will be turned to the buffer input again (1013) the header will be output (1015). However, for the period of time for deciphering processing, the last deciphered data of the frame will be input to the deciphering circuit 38, and when deciphering is started, the header of the following frame will be input to a buffer 34. It means that the decoding of the last part of the frame and the input of the following frame to the buffer are operated simultaneously.

The processing mentioned above must be repeated until all image ciphered data are processed (1006).

If at the step 1004 the ciphered flag is not detected, the frame data will be directly output to the buffer 34 (1014).

Further, in the case where data fast forwarding is carried out, the length of the next current frame will be reported to the reading circuit(decoder 24) and thereby the header of the next frame will be obtained. In the case where rewinding is operated, the length of the reframe will be reported to the reading circuit(decoder 24) and thereby the header of the reframe will be obtained.

EMBODIMENT 2

Figure 12:
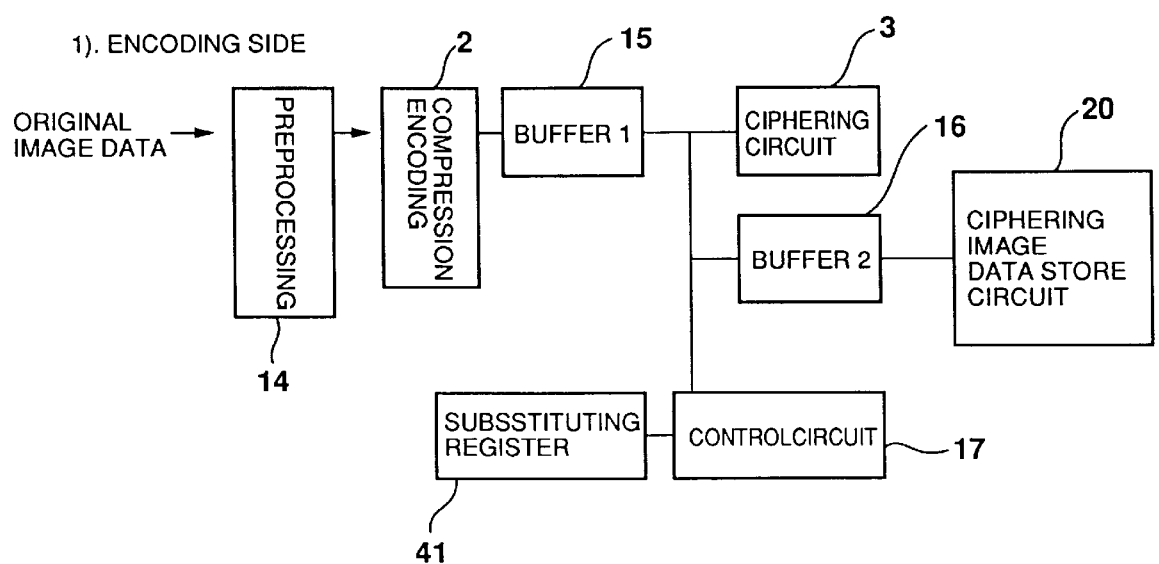
FIG. 12 is a block diagram showing the construction of an encoder at the embodiment 2.

FIG. 12 is a block diagram showing the functional construction of an encoder at the embodiment 2.

In this Figure, as the parts having the same symbols as those in FIG. 3 are provided with the same functions as in the case of the embodiment 1, their description will be omitted.

This embodiment is characterized in that a substituting register 41 is provided. The substituting register 41 is for inserting "1" into the pattern when the same synchronous pattern as the one indicating a header in ciphered and compressed image data is detected by a control circuit 17.

Next, a processing procedure at an encoder will be described with reference to FIG. 13.

First, the control circuit executes an initializing processing (1301). As it is similar to the one described referring to FIG. 5, description of the initialyzing processing will be omitted.

Then, a compressing and encoding circuit 2 is started (1302). Here, image data will be compressed, encoded and stored in a first buffer 15 (1303).

Then, frames are read in the inputting order of compressed and encoded data. After this, the headers of the frames will be transferred to a second buffer 16 (1304) and a ciphered flag will be hoisted (1305).

Then, when image data parts are ciphered in sequence by a ciphering circuit (1306) and a processing equivalent to 1 frame is completed, the data will be written in the second buffer 16 (1307).

This processing will be repeated until all frame data are finished (1309) and the frame image data are finished (1308).

Then, the control circuit 17 reads the substituting register 41, detects the existence of the same pattern as substituted code in the ciphered data written in the second buffer, and if it is found, it will insert data of 1 bit (1311).

Then, the data of 1 frame will be output from the second buffer to a ciphered image data storing circuit 20. When the next frame is read, a processing similar to the one mentioned above will be repeated until there are no data remaining in the first buffer. Moreover, the ciphering processing at the ciphering circuit 3 must be carried out by the same method as mentioned at the embodiment 1.

FIG. 14 (b) shows a frame format of ciphered and compressed image data obtained by the encoder at the embodiment 2.

In this Figure, as the same synchronous pattern 43b as the one inserted into a header area 43a is generated on a data area 43c, 1 bit (43e) is inserted between synchronous patterns 43d and 43f.

(PROCESSING AT THE DECODER SIDE)

FIG. 15 is a block diagram showing the function of the decoder at the embodiment 2.

As the parts in this Figure are provided with the same functions as in the case of the embodiment 1 having the same symbols as in FIG. 8, their descriptions will be omitted.

A ciphered image data reading circuit 44 includes, for example, a demodulation circuit 23 and a decoder 24. An expansion processing part 45 is provided with a function for expanding compressed MPEG data while an image display circuit 46 is provided with a function for outputting NTSC (National Television System Committee) signals or audio signals by carrying out D/A conversion, etc.

Figure 16:
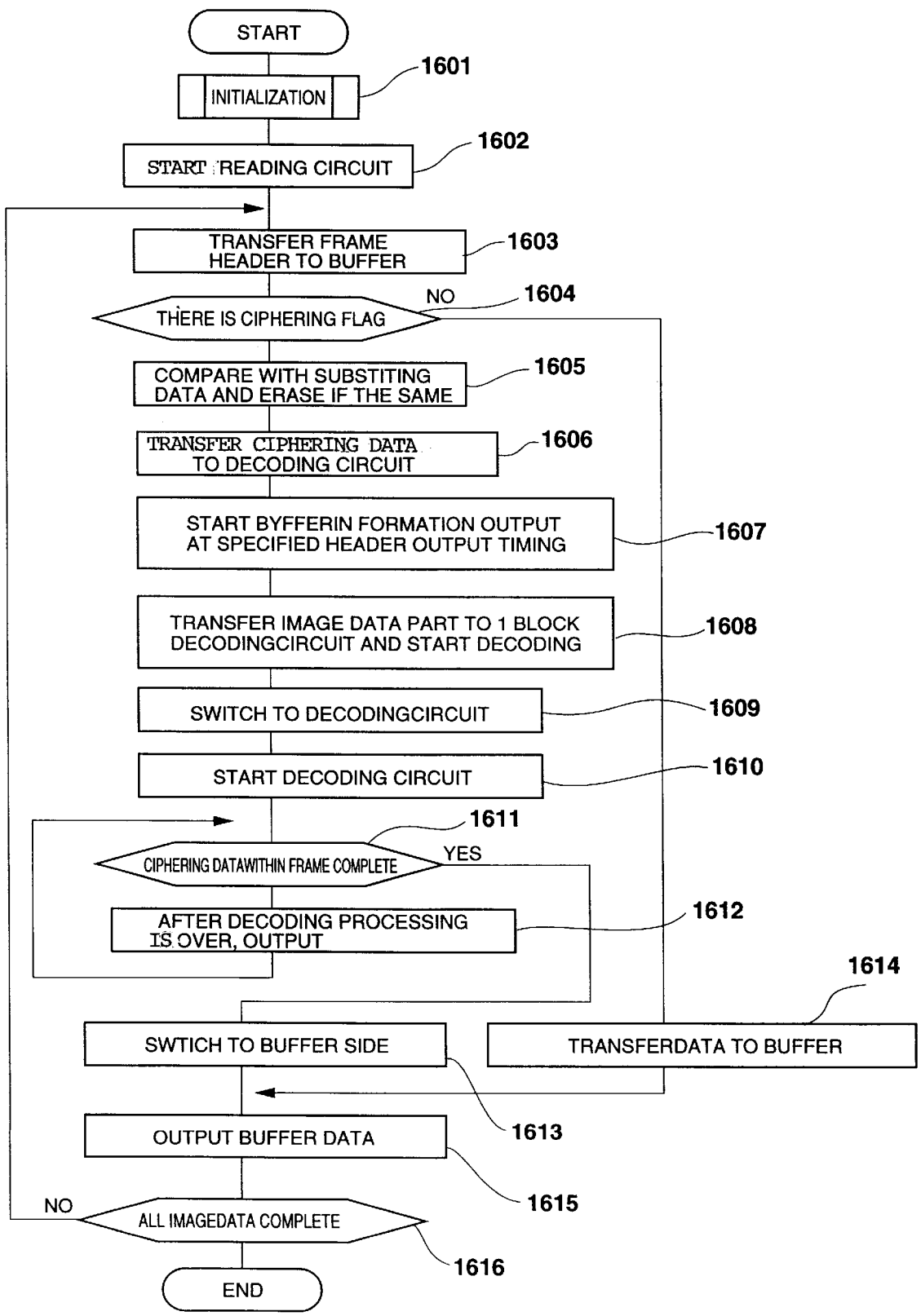
FIG. 16 is a flow chart showing a processing procedure at a decoder at the embodiment 2.

The procedure of decoding processing at this embodiment is shown in FIG. 16.

First, the control circuit 35 executes initialization of the circuit prior to ciphered data reading (1601). For this initialization, after key data setting on the deciphering circuit 38, ciphering mode setting and initial vector setting are made, the value of a buffer 34 will be cleared and a switch 37 will be set on the output side of the buffer 34.

When the above initializing processing is completed, data will be decoded by starting a reading circuit 44 (1602). The headers of frames read from the reading circuit 44 will be first input to the buffer 34 (1603). The control circuit 35 operates header analyzing, and when synchronous patterns are detected, whether a ciphered flag to be input following the frames exists or not will be inspected (1604). If there is a ciphered flag, ciphered data will be compared with substituted codes (1605). The ciphered data to be input are input to the buffer while being compared with the substituted codes, and when the same codes are detected, they will be input to the decoding circuit 38 by skipping bit inserted into the encoder (1606).

At the decoding circuit 38 decoding is carried out by block units. In the case where there are ciphered data not reaching the block, a processing as similar to a ciphering processing at the encoder side will be executed. The ciphered flag inserted into the frame at the encoding side at the time of ciphering will be erased.

Output of header data from the buffer 34 will be started at a timing (set beforehand) allowing outputting of decoded image data immediately after the frame data output (1607). At this time, a switch 37 must be set on the buffer output side.

After the header data output, the switch 37 will be changed to the output side of the decoding circuit 38 (1609) and decoded data will be output (1610).

The control circuit 35 sets a header output timing and a decoding processing end timing consulting a counter value.

When outputting of the equivalent to the frame is completed (1611), the control circuit 35 will change the switch 37 to the buffer side again and output the header (1613, 1615). However, as it takes time for decoding processing, when the last decoded data of the frame is input to the decoding circuit 38 and decoding is started, the header of the following frame will be input to the buffer. That is, processing of the last frame signal and inputting of the next frame to the buffer will be executed simultaneously.

Further, in the case where there is no ciphered flag detected at the step 1604, the control circuit 35 will immediately output data to the buffer (1614).

The processing described above will be repeated until all ciphered image data are processed (1616).

As for a means for distributing software from the center, though the example of CD-ROM was taken, HD-CD (High-Density CD), an optical disk, an optical magnetic disk, a magnetic disk or any other media may be used.

As clear from the descriptions thus far, according to the present invention, it will be possible to carry out decoding processing without any shifts in synchronization by inserting a ciphered flag indicating ciphered data and ciphered image data lengths into the headers of the ciphered image frames and identifying ciphering using the ciphered flag at the time of decoding in the case of operating ciphering and by ignoring the appearance of synchronous patterns on the ciphered data even when they are generated in the case of identifying ciphering. It will be also possible to carry out reverse reproduction by inserting the length of the reframe into the ciphered frame.

Further, according to the present invention, it will be possible to prevent appearance of synchronous patterns on the ciphered data parts by inserting a ciphered flag indicating the ciphered data into the header of the ciphered frame and inserting 1 bit data so as to prevent generation of the same synchronous patterns when the synchronous patterns appear on the ciphered image data. Consequently, by retrieving the synchronous patterns at the time of decoding frame synchronizations will be allowed. By identifying ciphering using the ciphered flag and finding that ciphering has actually occurred, inserted bit will be taken out of the ciphered data and thereby decoding will be operated more correctly.

Further still, as for ciphering of image data, by carrying out ciphering on a proper ciphering processing mode using an initial vector for each frame as a parameter, it will be possible to obtain totally different ciphered sentences from similar compressed image data.

What is claimed is:

1. An encoder comprising:

compressing and encoding means for compressing and encoding original data to produce compressed and encoded data in an input order;

data length obtaining means for carrying out frame analysis in the input order of the compressed and encoded data and obtaining a frame data length;

header generating means for generating a header storing synchronous patterns;

ciphering processing means for ciphering the compressed and encoded data to generate ciphered and compressed data; and data assembling means for assembling the header obtained by said header generating means, the frame data length and the ciphered and compressed data into a frame.

2. A decoder comprising:

header obtaining means for receiving data including synchronous patterns, frame data length data registering the frame data length of stored data and ciphered and compressed data, reading said synchronous patterns and obtaining a header;

frame data length obtaining means for reading said frame data length;

counter holding the frame data length obtained by said frame data length obtaining means;

deciphering means for sequentially deciphering said ciphered and compressed data based on the value of said counter, without said deciphering depending on frame analysis or unpacking compressed data; and expansion processing means for expanding compressed data from the decoding means.

3. An encoder comprising:

compressing and encoding means for compressing and encoding original data to produce compressed and encoded data;

header generating means for generating a header storing synchronous patterns;

ciphering processing means for ciphering the compressed and encoded data and generating ciphered and compressed data;

bit inserting means for monitoring said ciphering processing means and inserting a dummy bit into the synchronous patterns when the synchronous patterns in the ciphered and compressed data are detected; and data assembling means for assembling said obtained header and said ciphered and compressed data.

4. A decoder comprising:

header obtaining means for receiving data including synchronous patterns and ciphered and compressed data with a dummy bit inserted thereinto and obtaining a header by reading the synchronous patterns;

comparing means for comparing the ciphered and compressed data having the dummy bit inserted thereinto with substituted data in said decoder and skipping the ciphered and compressed data when the dummy bit is detected;

deciphering means for sequentially decoding the ciphered and compressed data and obtaining compressed data; and expansion processing means for expanding compressed data from said deciphering means.

5. The encoder of claim 1, wherein when data are sequentially ciphered by block units, if length of data to be lastly ciphered does not reach the last block length, this block is not processed by said ciphering processing means.

6. A method of encoding image data, comprising:

compressing and encoding the image data and storing the result into a first buffer;

analyzing frames of the image data and storing a header containing a result of said analyzing into a second buffer;

encrypting said image data in the first buffer and storing encrypted data into the second buffer to form a frame with the header;

storing the frame and header into an image data storing circuit upon completion of encryption;

attaching to the frame and header in the image data storing circuit an identifier indicating a frame sequence, and a ciphering flag indicating encryption status; and determining a length of the frame and storing the length in the header.

7. A memory medium storing a frame of image data, comprising:

a header part containing information on the frame of the image data;

an ID part holding an identifier for the frame of the image data;

a frame length part containing a length of the image data;

a ciphered flag indicating an encryption status of the image data; and a ciphering compressed image data part containing the image data which has been ciphered and compressed.

8. A memory medium storing a frame of image data, comprising:

a header part containing information on the image data;

an ID part containing an identifier for the frame of the image data;

a ciphered flag indicating an encryption status of the image data;

a ciphering compression image signal part holding the image data which has been ciphered and compressed; and a synchronizing pattern derived from the image data, composed of a 1 bit inserted between a first synchronizing code and a second synchronizing code.

9. A memory medium storing a frame of image data, comprising:

a header part containing information on the image data;

a frame length part containing a length of the image data; and a synchronizing pattern derived from the image data, composed of a 1 bit inserted between a first synchronizing code and a second synchronizing code.

10. The encoder of claim 1, wherein the compressed and encoded data are MPEG data.

* * * * *

UNITED STATES PATENT AND TRADEMARK OFFICE
CERTIFICATE OF CORRECTION

PATENT NO. : 5,838,791

DATED : November 17, 1998

INVENTOR(S) : Torii et al.

It is certified that error appears in the above-identified patent and that said Letters Patent is hereby corrected as shown below:

Cover Page, [73], "Kanagawa" should be --Kawasaki--;
[56], line 14, "Crutis" should be --Cruts--.

In the Drawings:

Cover page, box 10, "OBATAINING MEANS" should be --OBTAINING PART--.

FIG. 1, box 10, "OBATAINING MEANS" should be --OBTAINING PART--.

FIG. 3, box 2, "ENCODIONG" should be --ENCODING--.

FIG. 4, box 402, "STARTCOMPRESSION" should be --START COMPRESSION--;
box 404, "ANALIZE" should be --ANALYZE--;
box 409, "CIHERING" should be --CIPHERING--;
box 413, "DAT STORE" should be --DATA STORE--.

Figure 5:
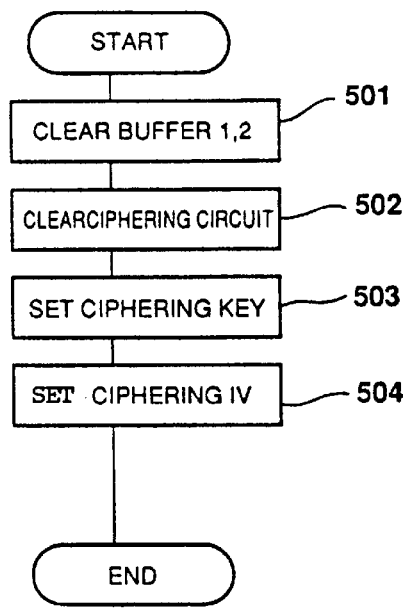
FIG. 5 is a flow chart showing the initializing procedure of an encoder at the embodiment 1.

FIG. 5, box 502, "CLEARCIPHERING" should be --CLEAR CIPHERING--.

FIG. 6, box 13c, "CIPEHRING" should be --CIPHERING--.

FIG. 7, box 27, "VIDEODECODING" should be --VIDEO DECODING--;
"TVMONITOR" (above "32") should be --TV MONITOR--.

FIG. 8, box 34, "BUFFFER" should be --BUFFER--;
box 35, "CONTRIOL" should be --CONTROL--.

UNITED STATES PATENT AND TRADEMARK OFFICE
CERTIFICATE OF CORRECTION

PATENT NO. : 5,838,791

DATED : November 17, 1998

INVENTOR(S) : Torii et al.

It is certified that error appears in the above-identified patent and that said Letters Patent is hereby corrected as shown below:

FIG. 9, box 33, "CONTRIOL" should be --CONTROL--;
"AUDIO BITSTRING" (below VIDEO BIT STRING) should be --AUDIO BIT STRING--.

FIG. 10, box 1002, "STARTREADING" should be --START READING--;
box 1006, "DECODINGCIRCUIT" should be --DECODING CIRCUIT--;
box 1016, "DATACOMPLETE" should be --DATA COMPLETE--.

FIG. 12, box 41, "SUBSSTITUTING" should be --SUBSTITUTING--.

Figure 13:
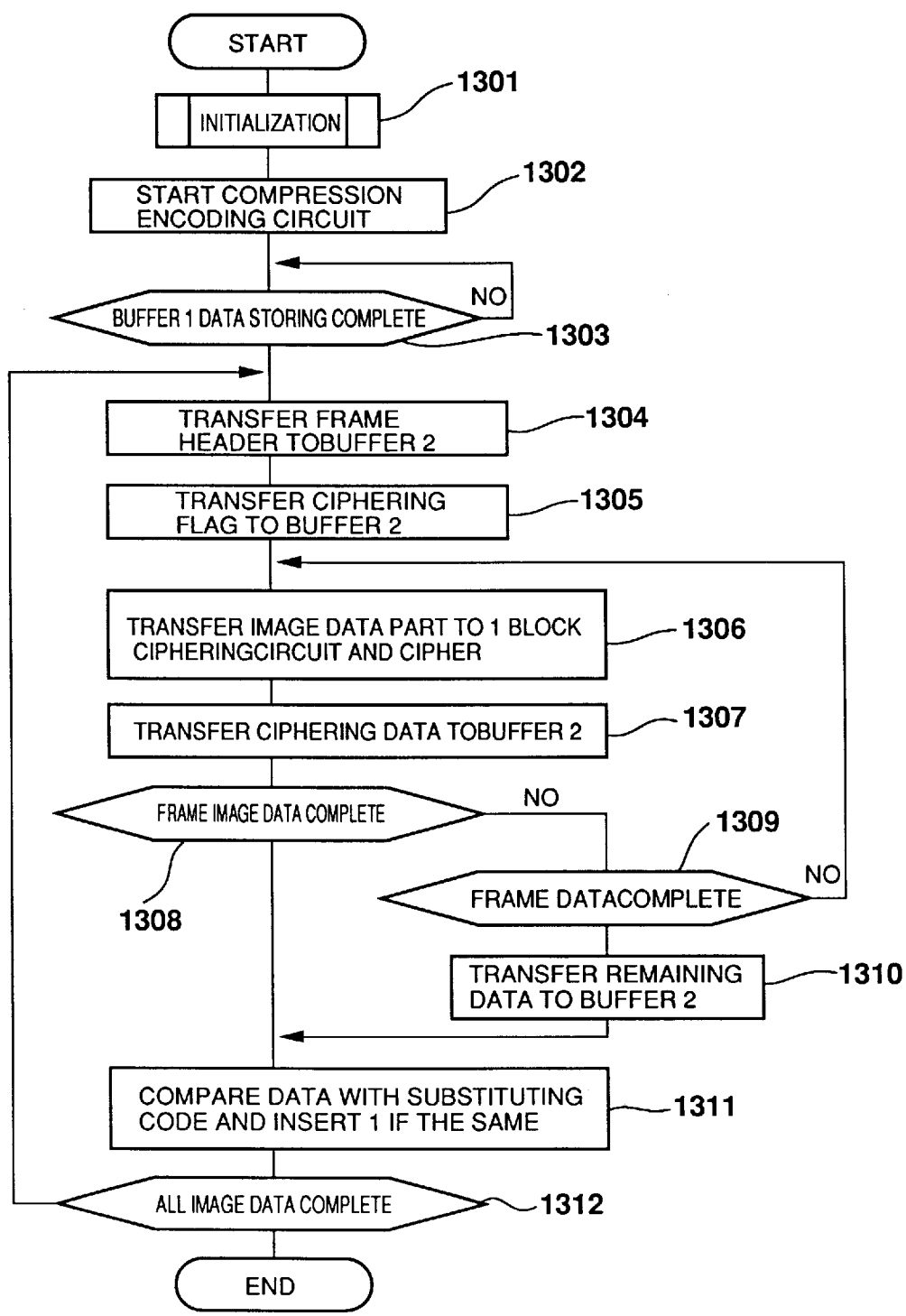
FIG. 13 is a flow chart showing a processing procedure at an encoder at the embodiment 2.

FIG. 13, box 1304, "TOBUFFER" should be --TO BUFFER--;
box 1306, "CIPHERINGCIRCUIT" should be --CIPHERING CIRCUIT--;
box 1307, TOBUFFER should be --TO BUFFER--;
box 1309, DATACOMPLETE" should be --DATA COMPLETE--;

FIG. 15, box 44, "READIG" should be --READING--.

FIG. 16, box 1605, "SUBSTITING" should be --SUBSTITUTING--
box 1607, "BYFFERIN" should be --BUFFERING--;
boxes 1608 and 1609, "DECODINGCIRCUIT" should be --DECODING CIRCUIT--;
box 1611, "DATAWITHIN" should be --DATA WITHIN--;
box 1614, "TRANSFERDATA" should be --TRANSFER DATA--;
box 1616, "IMAGEDATA" should be --IMAGE DATA--.

UNITED STATES PATENT AND TRADEMARK OFFICE
CERTIFICATE OF CORRECTION

PATENT NO. : 5,838,791
DATED : November 17, 1998
INVENTOR(S) : Torii et al.

It is certified that error appears in the above-identified patent and that said Letters Patent is hereby corrected as shown below:

Col. 1, line 41, "," should be --.--;
line 60, "en coded" should be --encoded--.

Col. 2, line 21, "The," should be --Then--.

Col. 3, line 10, after "THE" insert --INVENTION--;
line 11, delete "INVENTION".

Signed and Sealed this

Seventh Day of September, 1999

Attest:

Q. TODD DICKINSON

Attesting Officer   Acting Commissioner of Patents and Trademarks